United States Patent
Nicholson

(10) Patent No.: US 11,582,907 B2
(45) Date of Patent: Feb. 21, 2023

(54) SUPPORT MECHANISM FOR IMPLEMENT HEIGHT ADJUSTMENT OF GROUNDS MAINTENANCE VEHICLES

(71) Applicant: EXMARK MANUFACTURING COMPANY, INCORPORATED, Beatrice, NE (US)

(72) Inventor: Gary L. Nicholson, Beatrice, NE (US)

(73) Assignee: Exmark Manufacturing Company Incorporated, Beatrice, NE (US)

( * ) Notice: Subject to any disclaimer, the term of this patent is extended or adjusted under 35 U.S.C. 154(b) by 452 days.

(21) Appl. No.: 16/248,267

(22) Filed: Jan. 15, 2019

(65) Prior Publication Data

US 2020/0221634 A1 Jul. 16, 2020

(51) Int. Cl.
| | |
|---|---|
| A01D 34/74 | (2006.01) |
| A01D 34/46 | (2006.01) |
| A01D 34/81 | (2006.01) |
| A01D 34/66 | (2006.01) |
| A01D 34/54 | (2006.01) |

(52) U.S. Cl.
CPC ............. *A01D 34/74* (2013.01); *A01D 34/46* (2013.01); *A01D 34/54* (2013.01); *A01D 34/661* (2013.01); *A01D 34/81* (2013.01)

(58) Field of Classification Search
CPC ........ A01D 34/54; A01D 34/74; A01D 34/81; A01D 34/46; A01D 34/661
See application file for complete search history.

(56) References Cited

U.S. PATENT DOCUMENTS

| | | | | |
|---|---|---|---|---|
| 5,463,855 A | * | 11/1995 | Johnson | A01B 73/00 16/19 |
| 5,816,033 A | | 10/1998 | Busboom et al. | |
| 6,073,430 A | * | 6/2000 | Mullet | A01D 34/685 56/12.8 |
| 6,276,119 B1 | * | 8/2001 | Oshima | A01D 34/74 56/15.9 |

(Continued)

OTHER PUBLICATIONS

Worldlawn Power Equipment, Inc., "Hydro-Drive Walk Behind Mower" Operator's Manual, Models: WYW36FS481VH, WYW36FS481VHF, WYW48FS481VH, WYW48FS481VHF, WYW36FS4 81VHCA, WYW36FS481VHFCA, WYW48FS481VHCA, WYW48FS481VHFCA. Beatrice, Nebraska, USA. Aug. 30, 2016; 40 pages.

*Primary Examiner* — Thomas B Will
*Assistant Examiner* — Joan D Misa
(74) *Attorney, Agent, or Firm* — Mueting Raasch Group

(57) ABSTRACT

A grounds maintenance vehicle has a vehicle frame defining a column opening having a first end and a second end. An implement is coupled to the vehicle frame. A height adjustment column has a base and distal end, where the base is fixed to the implement. The distal end of the height adjustment column extends through the column opening from the first end beyond the second end. The height adjustment column defines a first locking structure and a plurality of height setting locations. A height selection tool is couplable to the height adjustment column and is translatable to each of the plurality of height setting locations. A second locking structure is coupled to the vehicle frame, where the second locking structure is configured to releasably engage the first locking structure such that the plurality of height setting locations are positioned beyond the second end of the column opening.

21 Claims, 7 Drawing Sheets

(56) References Cited

U.S. PATENT DOCUMENTS

| | | | |
|---|---|---|---|
| 6,438,930 B1 | 8/2002 | Velke et al. | |
| 6,658,831 B2 * | 12/2003 | Velke | A01D 34/74 |
| | | | 56/14.7 |
| 6,868,658 B2 * | 3/2005 | Velke | A01D 34/64 |
| | | | 56/15.8 |
| 7,240,470 B2 * | 7/2007 | Clement | A01D 34/64 |
| | | | 56/17.2 |
| 7,950,211 B1 * | 5/2011 | Ta | A01D 34/416 |
| | | | 56/12.7 |
| 9,723,781 B1 | 8/2017 | Covington | |
| 9,924,633 B2 * | 3/2018 | Ressler | A01D 34/74 |
| 10,609,863 B2 * | 4/2020 | Brunner | A01D 34/66 |
| 2006/0032205 A1 * | 2/2006 | Samejima | A01D 67/00 |
| | | | 56/320.1 |
| 2007/0028577 A1 * | 2/2007 | Clement | A01D 34/64 |
| | | | 56/17.2 |
| 2007/0062170 A1 | 3/2007 | Finkner | |
| 2019/0037768 A1 * | 2/2019 | Brunner | A01D 34/63 |
| 2020/0221634 A1 * | 7/2020 | Nicholson | A01D 34/661 |

* cited by examiner

SUPPORT MECHANISM FOR IMPLEMENT HEIGHT ADJUSTMENT OF GROUNDS MAINTENANCE VEHICLES

TECHNOLOGICAL FIELD

Embodiments of the present disclosure are generally related to maintenance vehicles. More particularly, embodiments of the present disclosure are related to implement height adjustment for maintenance vehicles.

BACKGROUND

Grounds maintenance vehicles such as lawn mowers, aerators, and spreader/sprayers are commonly used by homeowners and professionals alike. These vehicles are typically configured as walk-behind or ride-on vehicles having an attached implement (such as a grass cutting deck), where the implement is secured to a frame of the grounds maintenance vehicle. The height of the implement is generally adjustable relative to the vehicle frame and the ground. Some designs provide for manual adjustment of the height of the implement relative to the vehicle frame such as by a manually-adjustable position fastener associated with the implement that abuts the frame to set the desired height. The implement's weight exerts a force on the position fastener to, at least in part, secure the connection.

In some designs, to adjust the height of the implement, the implement is lifted by a user to release the weight of the implement on the vehicle frame so as to manually release the position fastener. Once the position fastener is released, the implement is then manually positioned by the user to the desired height relative to the vehicle frame and the ground, and then the position fastener is manually engaged at the proper location to position the implement at the desired height. Such a configuration requires that at least one hand or foot be used to lift and position the implement, and at least one hand be used to manually release and manually engage the position fastener. The implement's weight and shape can present challenges to this process, because some users may find it difficult to maintain or change the position of the implement with a single hand while manipulating the position fastener with the other hand.

SUMMARY

The technology disclosed herein can simplify the implement height adjustment process. For example, in some embodiments the present technology relates to a grounds maintenance vehicle. A vehicle frame defines a column opening having a first end and a second end. An implement is coupled to the vehicle frame. A height adjustment column has a base and a distal end, where the base is fixed to the implement and the distal end of the height adjustment column extends through the column opening from the first end beyond the second end. The height adjustment column defines a first locking structure and a plurality of height setting locations. A height selection tool is configured to be coupled to the height adjustment column, where the height selection tool is translatable to each of the plurality of height setting locations. A second locking structure is coupled to the vehicle frame, where the second locking structure is configured to releasably engage with the first locking structure such that the plurality of height setting locations are positioned beyond the second end of the column opening.

In some embodiments, the technology relates to a grounds maintenance vehicle having a vehicle frame and an implement translatably coupled to the vehicle frame. In particular, the implement is vertically translatable relative to the vehicle frame. A height selection tool is configured to select one vertical position of a plurality of selectable vertical positions. Each selectable vertical position limits a maximum distance between the implement and the vehicle frame, where at each vertical position, weight of the implement is received by the height selection tool. A support mechanism is configured to selectively position the implement relative to the vehicle frame. Upon engagement, the support mechanism is configured to prevent the weight of the implement from being received by the height selection tool. The support mechanism can be a horizontally pivotable latch.

In some embodiments, the technology relates to a mower. A vehicle frame defines a plurality of column openings each having a first end and a second end. Wheels are coupled to the vehicle frame. A cutting deck is coupled to the vehicle frame. The cutting deck has a cutting blade and a housing defining a cutting chamber, where the cutting blade is rotatably disposed in the cutting chamber. A plurality of height adjustment columns each have a base and a distal end, and each define a series of pin openings between the base and the distal end. Each base is fixed to the cutting deck and each height adjustment column slidably extends through a corresponding column opening of the plurality of column openings from the first end beyond the second end.

In various such mowers, a plurality of height selection tools are each associated with a particular height adjustment column of the plurality of height adjustment columns. Each height selection tool has an adjustment collar slidably disposed on the associated height adjustment column and a pin configured to be removably received by any one of the series of pin openings of the associated height adjustment column. Each adjustment collar is configured to be positioned between the second end of the corresponding column opening and the pin. A support mechanism has a first locking structure defined by at least one height adjustment column of the plurality of height adjustment columns and a second locking structure configured to releasably engage with the first locking structure such that the series of pin openings are positioned outside of the corresponding column opening, beyond the second end of the column opening. The first locking structure is at least a portion of an annular facing surface defined by each height adjustment column and the second locking structure is defined by a manually engageable latch, wherein the latch is horizontally rotatable.

The above summary is not intended to describe each embodiment or every implementation. Rather, a more complete understanding of illustrative embodiments will become apparent and appreciated by reference to the following Detailed Description of Exemplary Embodiments and claims in view of the accompanying drawings.

BRIEF DESCRIPTION OF THE DRAWINGS

Exemplary embodiments will be further described with reference to the figures, wherein.

Figure 1A:
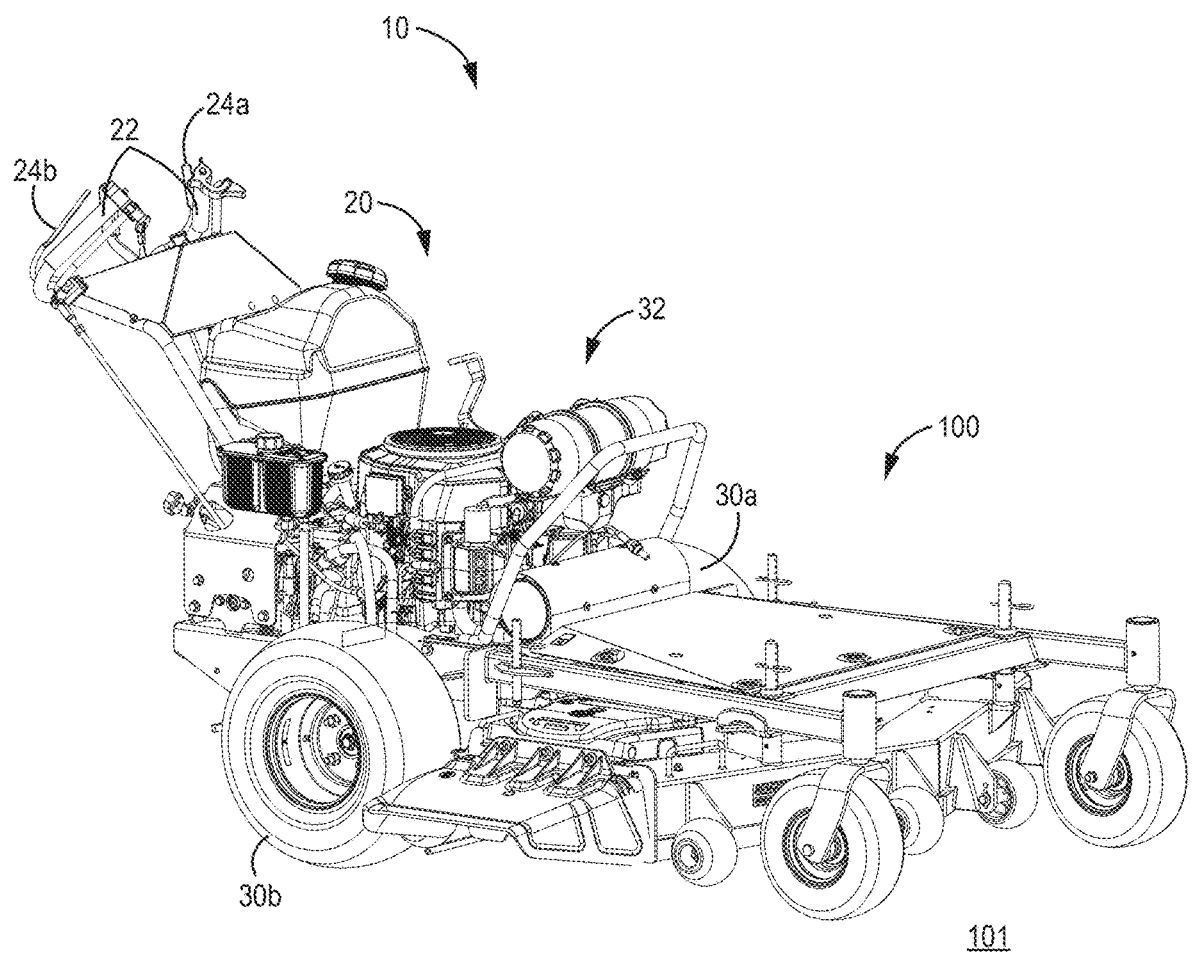
FIG. 1(a) depicts an example grounds maintenance vehicle in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the embodiments described herein. The lack of illustration/description of such structure/components in a particular figure is, however, not to be interpreted as limiting the scope of the various embodiments in any way.

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

All headings and subheadings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

It is also noted that the term "comprises" (and variations thereof) does not have a limiting meaning where this term appears in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or from the perspective of one operating the vehicle while it is in an operating configuration. These terms are used only to simplify the description, however, and are not meant to limit the interpretation of any embodiment described.

With reference to the figures, where like reference numerals designate like parts and assemblies throughout the several views, FIG. 1(*a*) illustrates an example grounds maintenance vehicle 10 in accordance with the present disclosure, which can simply be referred to as a "vehicle". The vehicle 10, in the current example, is a wide area walk-behind lawn mower. While embodiments are described herein with respect to such a mower, this disclosure is equally applicable to mowers having alternate configurations (e.g., riding mowers and stand-on mowers). The embodiments also apply to other types of grounds maintenance vehicles (e.g., aerators, spreader/sprayers, dethatchers, debris management systems, blowers, vacuums, sweepers, general purpose utility vehicles, etc.) without limitation.

The vehicle 10 has a first portion that is an implement assembly 100 and a second portion that is a drive assembly 20. The drive assembly 20 of the grounds-maintenance vehicle 10 can have drive wheels 30 and a prime mover 32 (e.g., internal combustion engine or electric motor) that are configured to selectively propel the vehicle 10 across the ground 101. The drive assembly 20 can have handles 22 by which the vehicle 10 is directed and controlled by an operator. The drive assembly 20 can also have various controls 24 that can be manipulated by the operator.

Figure 1B:
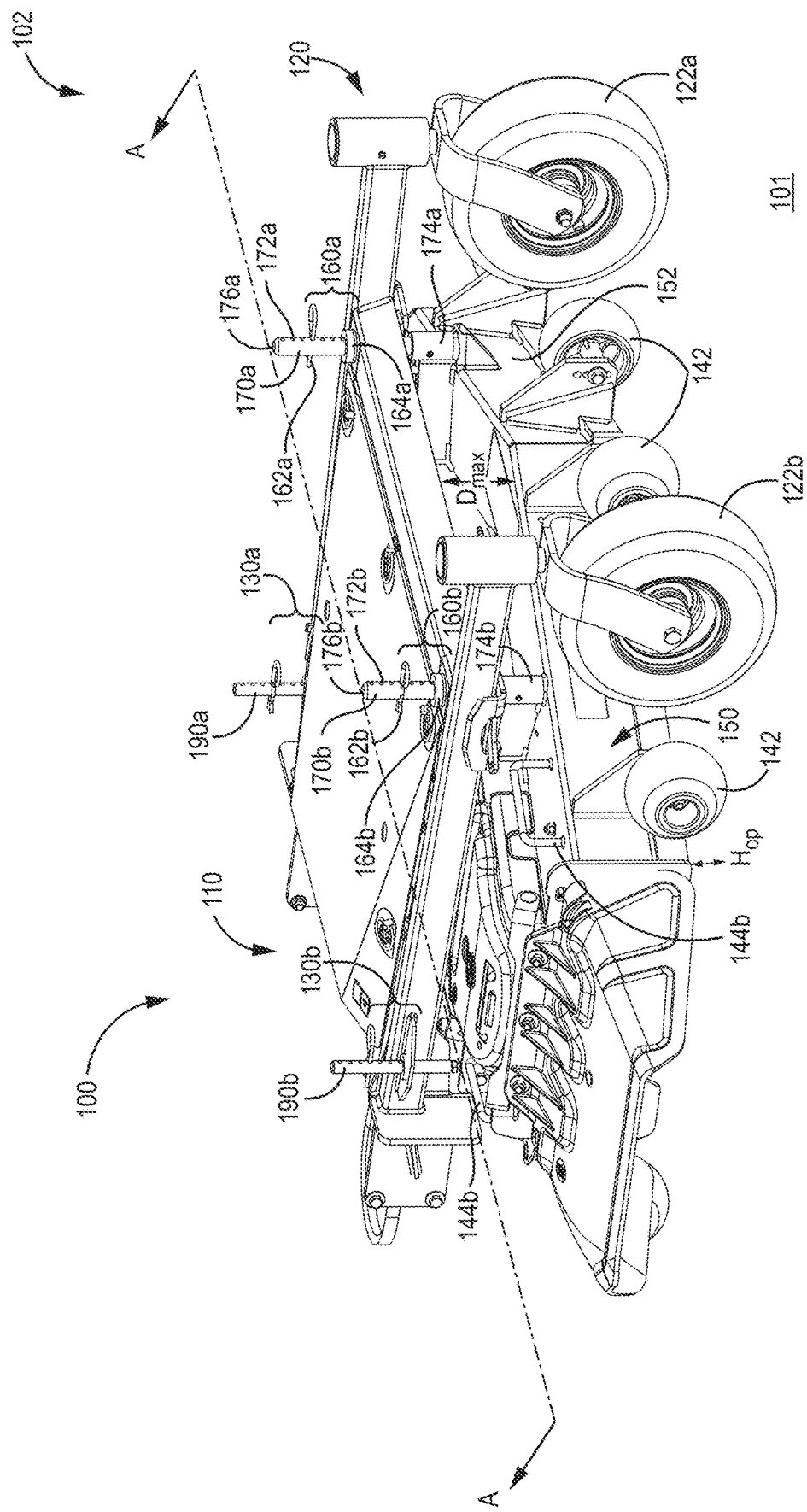
FIG. 1(b) depicts an illustrative exemplary height adjustment device in accordance with embodiments of the present disclosure.
Figure 2:
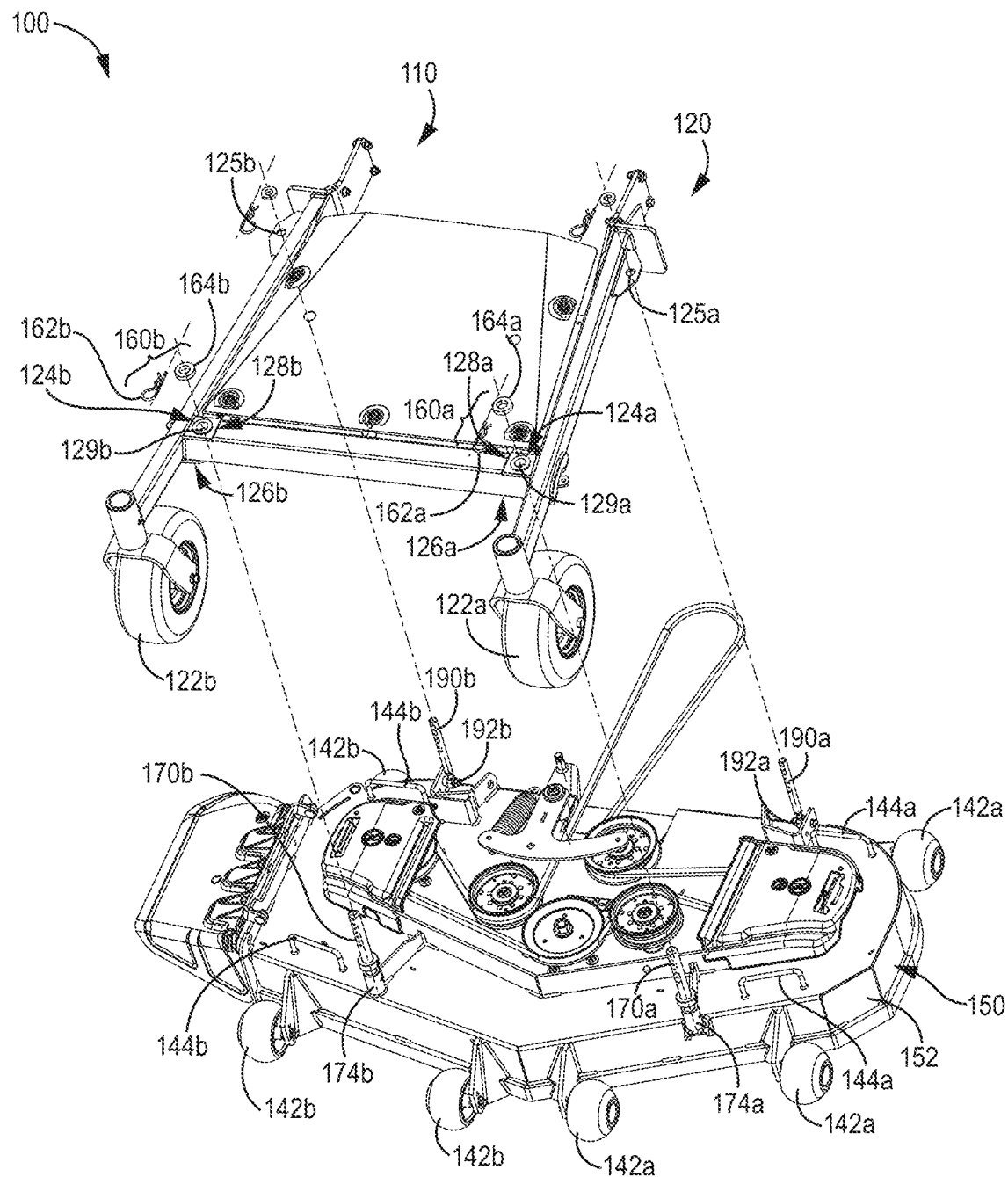
FIG. 2 depicts an exploded view of the exemplary device of FIG. 1(b).
Figure 3:
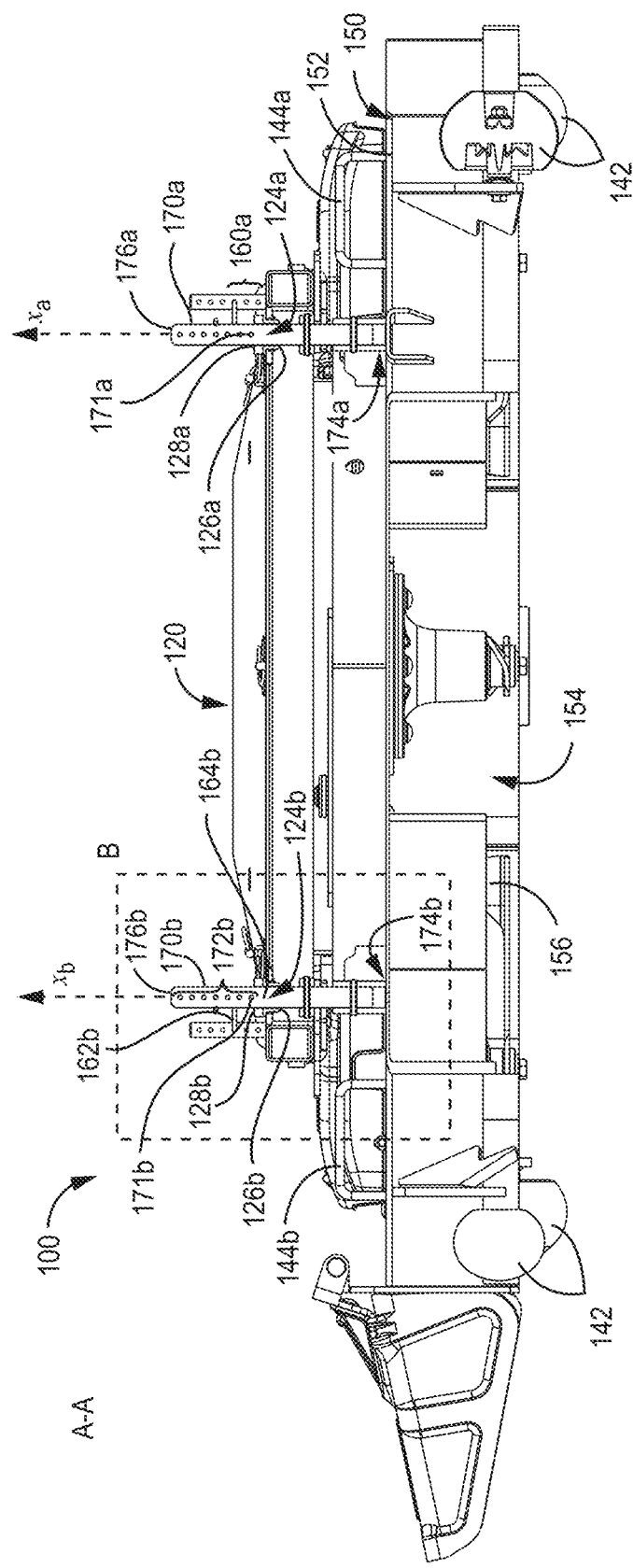
FIG. 3 depicts a cross-sectional view A-A of FIG. 1(b).
Figure 4:
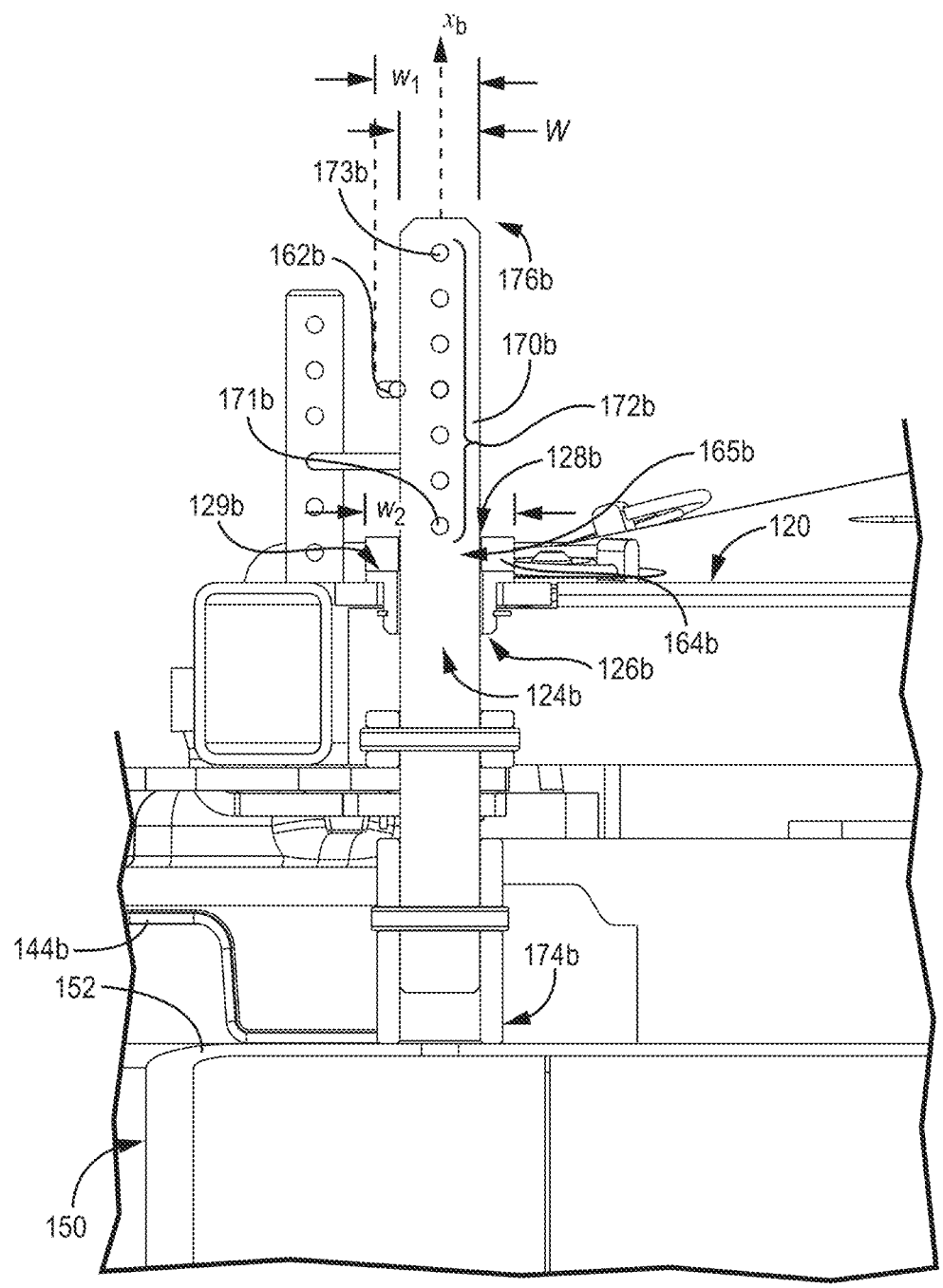
FIG. 4 depicts detail view B of FIG. 3.

FIG. 1(*b*) depicts an example implement assembly 100 consistent with FIG. 1(*a*), and FIG. 2 depicts an exploded view of the implement assembly 100 of FIG. 1(*b*). FIG. 3 depicts a cross-sectional view of FIG. 1(*b*), and FIG. 4 is detail view B of FIG. 3. The currently-depicted implement assembly 100 is a mower assembly 100 that can be consistent with a ride-on lawn mower or a walk-behind lawn mower (as depicted in FIG. 1(*a*)), as examples. In particular, the implement assembly 100 has an attachment end 110 that can be configured to attach to (or be integrally formed with) the second portion of a grounds-maintenance vehicle. The second portion of the grounds-maintenance vehicle can define components consistent with a ride-on lawn mower or a walk-behind lawn mower (such as that depicted in, and described with reference to, FIG. 1(*a*)).

The suffixes "a" and "b" may be used throughout this description to denote various left- and right-side parts/features, respectively. The parts/features denoted with "a" and "b" suffixes can be substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature and may correspond to a reference numeral on a drawing that is accompanied by a letter suffix.

As shown in FIGS. 1(*b*) and 2, the implement assembly 100 has a vehicle frame 120 and an implement 150 coupled to the vehicle frame 120, where the implement 150 is configured to perform a maintenance task on a surface, such as the ground surface 101. In the current example, where the vehicle 10 (FIG. 1(*a*)) has a lawn mower assembly 100, the implement 150 is a cutting deck having a housing 152 defining a cutting chamber 154 (see FIG. 3). Cutting blades 156 (visible in FIG. 3) are rotatably disposed in the cutting chamber 154. As stated above, other cutting decks (e.g., belly-mounted decks, towed decks, reel units, etc.), as well as other implements, are contemplated within the scope of this disclosure. During operation, power is selectively delivered to the cutting blades 156 by the engine, whereby the blades rotate at a speed sufficient to sever grass and other vegetation over which the deck passes.

The vehicle frame 120 has a first ground engaging member 122*a* and a second ground engaging member 122*b* that are disposed between the vehicle frame 120 and the ground surface 101. The ground engaging members 122*a*, 122*b* are generally configured to accommodate translation of the vehicle frame 120 across the ground surface 101. In the current example, the ground engaging members 122*a*, 122*b* are wheels that are rotatably coupled to the vehicle frame 120. More particularly, the ground engaging members 122*a*, 122*b* are caster wheels that rotate (for rolling) and swivel (for turning) and are coupled to the front end 102 of the vehicle frame 120. In some embodiments, the ground engaging members can be alternate structures or components other than caster wheels such as tracks, rollers, or drive wheels.

The implement 150 is generally configured for operational interaction with the ground surface 101. In the current example, the implement 150 is configured to be disposed between at least a portion of the vehicle frame 120 and the ground surface 101. The implement 150 can have a plurality of rollers 142 (e.g., anti-scalp rollers) configured to be disposed between the implement 150 and a ground surface 101 to limit contact between the implement 150 and the ground. The plurality of rollers 142 can also be configured to facilitate translation of the implement 150 across the ground surface 101. In a variety of embodiments, the implement 150 has one or more handles 144 that are configured to be manually grasped by a user to lift at least a portion of the implement 150 relative to the ground surface 101 and the vehicle frame 120 for the purpose of implement height adjustment or maintenance.

As visible in FIG. 2, the implement 150 is coupled to the vehicle frame 120 through one or more height adjustment columns 170. Each height adjustment column 170 has a height selection tool 160 coupled thereto. In the illustrated embodiments, the height selection tool 160 can collectively include both a pin 162 and an adjustment collar 164, as will be described below. The height adjustment column 170 has a base 174 fixed to the implement 150 and a distal end 176. The vehicle frame 120 defines a column opening 124 having a first end 126 and a second end 128, which is particularly visible in FIG. 4. A portion of the height adjustment column 170, and particularly the distal end 176, is configured to extend through the corresponding column opening 124 from the first end 126 beyond the second end 128. "Beyond the second end" and related phrases as used herein means that the relevant element is positioned vertically above the second end, which is differentiated from a position vertically below the second end, such as within the column opening 124 and vertically below the first end 126.

A height selection tool 160 is configured to be coupled to each height adjustment column 170. When the height selection tool 160 is coupled to each height adjustment column 170, the height selection tool 160 and the height adjustment column 170 have a combined width dimension w that exceeds a corresponding width W of the second end 128 of the column opening 124. "Corresponding width," is used to mean the width of the second end 128 that is in vertical alignment with the combined width dimension of the height selection tool 160 and the height adjustment column 170. Each of the combined width dimension and the corresponding width W is measured perpendicularly to the longitudinal axis x of the height adjustment column 170.

In various embodiments, including that depicted, the corresponding width W of the second end 128 of the column opening 124 is a diameter. In another embodiment, the corresponding width W of the second end 128 of the column opening 124 is a diagonal measurement, such as in embodiments where the second end 128 of the column opening 124 has a square or rectangular shape. The second end 128 of the column opening 124 can have other shapes, as well.

The height adjustment column 170 generally defines a plurality of height settings which are each selectable by the height selection tool 160. Each height setting can define a particular operating height of the implement 150 relative to the ground surface 101. Each height setting can also define a particular vertical position of the implement 150 relative to the ground surface 101 (assuming a relatively planar ground surface 101) and the vehicle frame 120. The plurality of height settings can be discrete locations along the height adjustment column 170. The height adjustment column 170 extends in a direction parallel to the direction of translation of the implement 150 relative to the vehicle frame 120 for adjustment of the vertical position of the implement 150.

The height selection tool 160 is configured to select one vertical position of a plurality of selectable vertical positions to limit a maximum distance $D_{max}$ (visible in FIG. 1(b)) between the implement 150 and the vehicle frame 120. Each maximum distance between the implement and the vehicle frame 120 corresponds to a maximum operating height $H_{op}$ (FIG. 1(b)) of the implement 150 relative to the ground surface 101. That is to say, the height selection tool 160 is coupled to the height adjustment column 170 at a particular height setting location of a plurality of height setting locations 172 (where element number 172 is also used herein to reference the pin openings 172 that define each of the height setting locations in this example) to define (1) a maximum distance $D_{max}$ between the implement 150 relative to the vehicle frame 120 and (2) the maximum operating height $H_{op}$ of the implement 150 relative to the ground surface 101.

It is noted that portions of the implement 150 may translate vertically upward towards the vehicle frame 120 (which decreases the distance between the implement 150 and the vehicle frame 120) to accommodate an uneven ground surface 101 where a portion of the ground surface 101 has a height that exceeds the distance between the implement 150 and the rest of the ground. Similarly, the operating height of the implement 150 relative to the ground surface 101 decreases when the portion of the ground surface 101 under the implement 150 has a height that exceeds the height of the portion of the ground surface 101 under the ground engaging members 122 of the vehicle frame 120. As such, the maximum distance between the implement 150 and the vehicle frame 120 and the maximum operating height of the implement 150 relative to the ground surface 101 is determined when the implement assembly 100 is positioned on generally horizontal ground surface 101.

In an example implementation, the handle 144 of the implement 150 can be grasped to manually lift the implement 150 and translate the height adjustment column 170 until the desired selectable vertical position (e.g., pin opening 172) of height adjustment column 170 is beyond the second end 128 of the column opening 124. The height selection tool 160 can then be engaged as described below.

Generally, the height selection tool 160 can be translated along the height adjustment column 170 to each of the plurality of height setting locations 172, such as from a first height setting location 171 (where element 171 is also used to reference a first pin opening) to a last height setting location 173, as visible in FIG. 4. The last height setting location 173 is positioned towards the distal end 176, and the first height setting location 171 is positioned between the last height setting location 173 and the base 174. The height selection tool 160 can be continuously translatable along the length of the height adjustment column 170, such as by sliding. Or, the height selection tool 160 can be translated along the length of the height adjustment column 170 through discrete manipulation, such as by detaching and re-attaching. In some embodiments, the height selection tool 160 is manually coupled to the height adjustment column 170.

Because the height selection tool 160 and the height adjustment column 170 have a combined width w that is greater than the corresponding width W of the second end 128 of the column opening 124, gravitational force on the implement 150 causes the height selection tool 160 to rest on or abut a perimetric surface 129 (particularly visible in FIGS. 2 and 4) on the vehicle frame 120 about the second end 128 of the column opening 124. The weight of the implement 150 is received by each of the height selection tools 160 onto the vehicle frame 120, which results in shear and compressive force on the height selection tools 160. In various embodiments, at each vertical position, the height selection tool 160 is configured to be under shear and/or compressive force between the implement 150 and the vehicle frame 120. Such shear and/or compressive force can help maintain the position of the height selection tool 160 and prevent slipping of the height selection tool 160 relative to the height adjustment column 170.

The height selection tool 160 can have a variety of configurations, but in embodiments consistent with the current example, the height selection tool 160 has a pin 162 and an adjustment collar 164, where the adjustment collar 164 is slidably disposed on the height adjustment column 170 and is configured to be positioned between the second end 128 of the column opening 124 and the pin 162. The adjustment collar 164 defines an opening 165 that is configured to slidably receive the height adjustment column 170.

Figure 5:
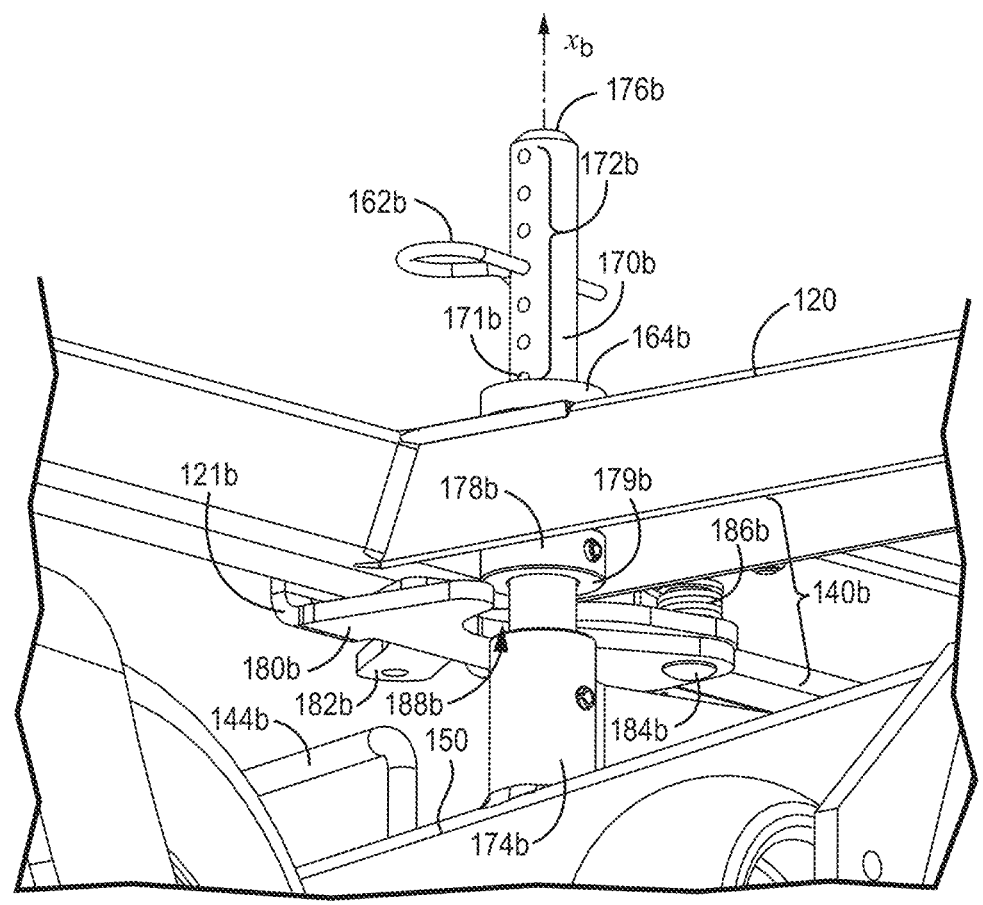
FIG. 5 is a first perspective view of various components of a height adjustment device in accordance with embodiments of the present disclosure.
Figure 6:
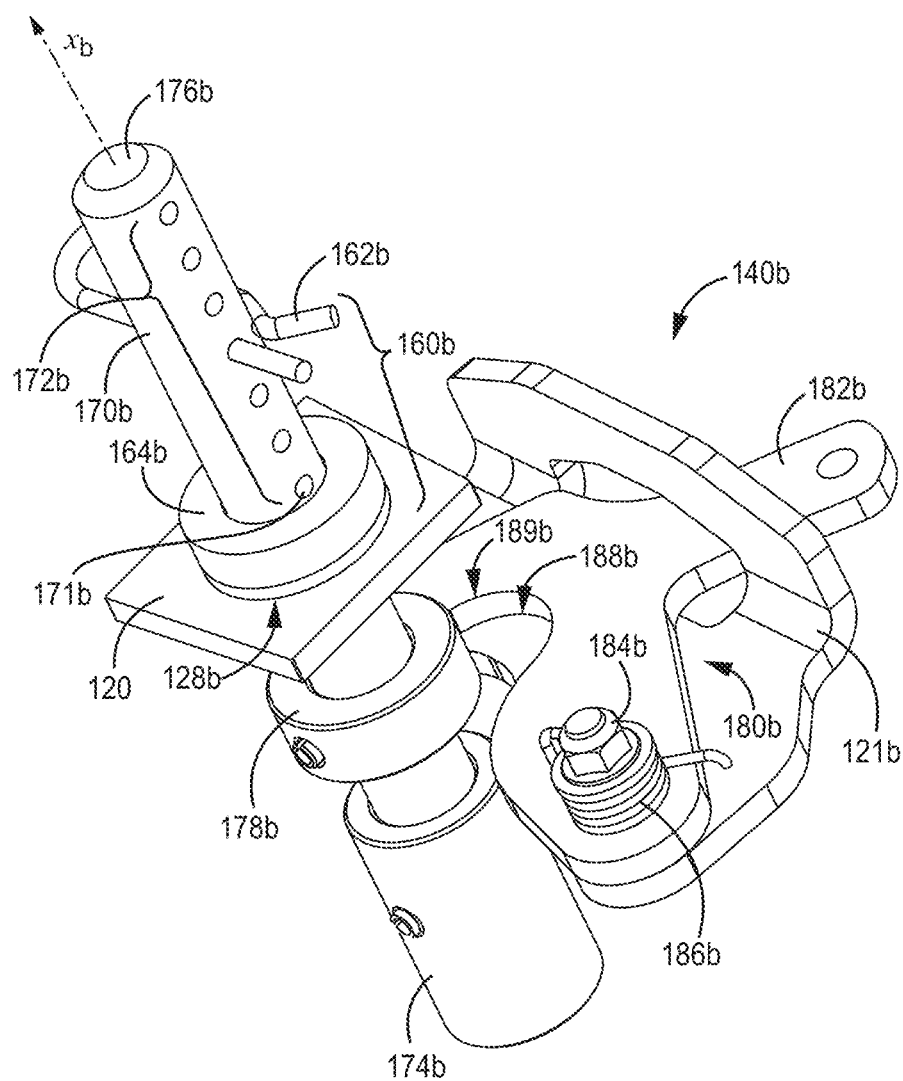
FIG. 6 is a second perspective view of the height adjustment device of FIG. 5 with some structure removed to better illustrate aspects of the device.

Moreover, the plurality of selectable vertical positions of the implement 150 relative to the vehicle frame 120 can be defined by a series of pin openings 172 defined by the height adjustment column 170. Each pin opening in the series of pin openings 172 defines a discrete height setting, which, in turn, defines a maximum distance between the implement 150 and the vehicle frame 120 and/or ground surface 101. The series of pin openings 172 are defined by the height adjustment column 170 between its base 174 and distal end 176. Each pin opening in the series of pin openings 172 is configured to selectively receive the pin 162. In various examples, the pin 162 is configured to be received by any one of the pin openings 172, as shown in FIGS. 5 and 6. However, other configurations are certainly also contemplated. In this way, the pin 162 is translatable from the first pin opening 171 to other pin openings 172 towards the distal end of the height adjustment column 170.

When the pin 162 is coupled to the height adjustment column 170, they (the pin 162 and the height adjustment column 170) have a combined width $w_1$ that exceeds the corresponding width W of the second end 128 of the column opening 124. Similarly, when the pin 162 is coupled to the height adjustment column 170, they (the pin 162 and the height adjustment column 170) have a combined width $w_1$ that exceeds the corresponding width of the adjustment collar 164 opening 165 which, in this case, is equal to the corresponding width W of the second end 128 of the column opening 124. Also, the adjustment collar 164 and the height adjustment column 170 have a combined width $w_2$ (see FIG. 4) that exceeds the corresponding width W of the second end 128 of the column opening 124.

The current examples depicted incorporate secondary height adjustment columns 190a, 190b (see FIG. 2) coupled to the implement 150 towards the attachment end 110 of the implement assembly 100, whereas the height adjustment columns 170a, 170b discussed herein are coupled to the implement 150 towards the front end 102 of the implement assembly 100. The vehicle frame 120 defines column openings 125a, 125b, where each secondary height adjustment column 190a, 190b extends through a corresponding column opening 125a, 125b. The secondary height adjustment columns 190a, 190b are generally similar to the height adjustment columns 170a, 170b already described, except that the secondary height adjustment columns 190a, 190b are pivotably coupled to the implement 150 at pivots 192a, 192b, respectively (see FIG. 2), rather than being fixed. The pivot 192 can be a ball joint. A secondary height selection tool 130 (see FIG. 1(b)) can be coupled to each secondary height adjustment column 190a, 190b, where the secondary height selection tool 130 is consistent with other height selection tools described herein.

In some alternate embodiments, the implement assembly 100 has four height adjustment columns that are each fixed to the implement 150. In other embodiments, the vehicle has four height adjustment columns that are each pivotably coupled to the implement 150. In still other embodiments, any combination or quantity of fixed and pivotable height adjustment columns are possible.

The height selection tools and the height adjustment columns can have various alternate configurations. While, in the current implementation, the height selection tool 160 is the pin 162 and the adjustment collar 164, in other embodiments the adjustment collar 164 can be omitted. In some embodiments, the height selection tool can be a manually engageable, circumferential or semi-circumferential clamp extending around the height adjustment column. In such embodiments, the clamp can have an outer diameter that exceeds the outer diameter of the second end of the column opening 124. In some such embodiments, the height adjustment column can define a series of circumferential or semi-circumferential grooves that are configured to align with the circumferential or semi-circumferential clamp. In this way, the circumferential or semi-circumferential grooves can define discrete height settings. Other configurations are also contemplated.

In accordance with embodiments disclosed herein, under static conditions the height selection tool 160 is generally maintained under shear and/or compressive forces between the implement 150 and the vehicle frame 120. In order to reset the maximum distance between the implement 150 and the vehicle frame 120, it may be necessary or desirable to first release the forces on the height selection tool 160 before the tool is moved to a second height setting. In particular, it can be challenging to decouple the height selection tool 160 from the height adjustment column 170 when the latter is under shear and/or compressive forces from the weight of the implement 150. Therefore, implementations of the technology disclosed herein incorporate a support mechanism. The support mechanism is generally configured to selectively position the implement 150 relative to the vehicle frame 120 to prevent shear and/or compressive forces on the height selection tool 160 exerted by the vehicle frame 120 and the implement 150. An exemplary support mechanism is illustrated in more detail with respect to FIGS. 5 and 6.

FIG. 5 is a first perspective view of an example support mechanism 140 consistent with the example implementation depicted in FIGS. 1-4. FIG. 6 is a partially isolated second perspective view of the example support mechanism 140. The support mechanism 140 is configured to selectively support the implement 150 relative to the vehicle frame 120 to prevent the implement 150 weight from exerting force on the height selection tool 160, regardless of its height setting location. In particular, the support mechanism 140 fixes the implement 150 at a particular distance from the vehicle frame 120 that prevents contact between the height selection tool 160 and the perimetric surface 129 (FIG. 4) of the vehicle frame 120 about the second end 128 of the column opening 124. More particularly, the support mechanism 140 fixes the implement 150 in a vertical position where each height setting location 172 on the height adjustment column 170, including the first height setting location 171, is positioned outside of the column opening 124, beyond the second end 128 of the column opening 124. As such, the height selection tool 160 can be decoupled from and coupled to the height adjustment column 170 without (1) forces from the weight of the implement 150 inhibiting such actions and (2) a user having to lift and vertically position the implement 150 while de-coupling and coupling the height selection tool 160. In various embodiments the implement 150 is lifted and the support mechanism 140 is engaged (e.g., with the height adjustment column 170) at a particular distance between the implement 150 and the vehicle frame 120.

The support mechanism 140 can have a first locking structure 179 (FIG. 5) and a second locking structure 189 (FIG. 6). The first locking structure 179 is coupled to the implement 150 and the second locking structure 189 is coupled to the vehicle frame 120. The height adjustment column 170 of the implement 150 can define the first locking structure 179 in examples consistent with the current embodiment. The second locking structure 189 can be configured to releasably engage the first locking structure 179. The first locking structure 179 and the second locking structure 189 are configured to engage such that the plurality of height setting locations 172 (including the first height setting location 171) on the height adjustment column 170 are positioned outside of the column opening 124 (best visible in FIG. 4), beyond the second end 128 of the column opening 124. With the support mechanism 140 engaged, the height selection tool 160 can be positioned at any of the height setting locations 172 without a user actively lifting and manually positioning the implement 150.

In embodiments consistent with the current figures, the first locking structure 179 is defined by a fixed collar 178 defined around the height adjustment column 170. Each of the height setting locations 172 (including the first height setting location 171), which again are defined by a series of pin openings in the current example, are positioned between the first locking structure 179 and the distal end 176 of the height adjustment column 170. In particular, the first locking structure 179 is at least a portion of an annular facing surface of the fixed collar 178. The second locking structure 189 is defined by an oppositely-facing surface of a latch 180 (FIG. 6). In use, the implement 150 is lifted (such as with a handle 144) to a vertical position relative to the vehicle frame 120 such that the first locking structure 179 is positioned above the second locking structure 189. The latch 180 can be translated to a position where the second locking structure 189 is in vertical alignment with the first locking structure 179. The implement 150 can be released such that the second locking structure 189 receives the implement's 150 weight via the first locking structure 179 and gravity. This structure results in contact between the first locking structure 179 and the second locking structure 189.

The support mechanism 140 can have a variety of configurations but is generally configured to fix the implement 150 at a particular vertical position relative to the vehicle frame 120. The specific implementation of the support mechanism 140 consistent with FIGS. 5 and 6 has a horizontally pivotable latch 180 and a fixed collar 178 that are configured to mutually engage. "Horizontally pivotable" as used herein means that the latch is pivotable in a plane perpendicular to the longitudinal axis x of the height adjustment column 170. While the latch 180 defines an opening 188 configured to at least partially receive the height adjustment column 170, in some embodiments the latch 180 does not define such an opening.

The latch 180 is coupled to the vehicle frame 120 at a latch fixture 121 via a pivot joint 184. In various embodiments the support mechanism 140 is manually engageable and manually disengageable. The support mechanism 140 can be manually engageable and manually disengageable via a handle 182. For example, the handle 182 may be sized and configured to be grasped by a user. In other embodiments the support mechanism 140 can be operated by a foot pedal. In some embodiments, the support mechanism can be operated by a solenoid or other electro-mechanical device.

In the current example, a spring 186 (e.g., a torsion spring) is operatively disposed between the latch fixture 121 and the latch 180. The spring 186 is generally configured to bias the latch 180 towards a particular position. In some embodiments, the spring 186 biases the latch 180 towards the height adjustment column 170. In some such embodiments, the spring 186 biases the latch 180 towards vertical alignment between the first locking structure 179 of the height adjustment column 170 and the second locking structure 189 of the latch 180. In some other embodiments, the spring 186 biases the latch 180 away from the height adjustment column 170. In such embodiments, lifting the implement 150 vertically to release the weight of the implement 150 on the second locking structure 189 from the first locking structure 179 allows the spring 186 to automatically pivot the latch 180 away from the height adjustment column 170 and disengage the support mechanism 140.

Some embodiments of the support mechanism 140 can omit a spring operatively disposed between the vehicle frame 120 and the latch 180. In some of those embodiments, a frictional component can be disposed between the latch and the vehicle frame that creates a frictional force between the latch and the vehicle frame. The frictional force can resist translation of the latch relative to the vehicle frame absent application of a sufficient translation force on the latch. The frictional component can also define space between the vehicle frame (in particular, the latch fixture 121 from the description above) and the latch. The frictional component can be a spring disc washer, for example, but other types of components can be used as well.

In the current examples, a first support mechanism is configured to selectively couple the vehicle frame 120 to the implement 150 at a first height adjustment column 170a and a second support mechanism is configured to selectively couple the vehicle frame 120 to the implement 150 at a second height adjustment column 170b. In various examples, including that depicted in FIG. 1(b), there are no support mechanisms configured to selectively couple to the secondary height adjustment columns 190a, 190b. However, in some alternate embodiments, a support mechanism is configured to selectively couple to each height adjustment column, including the secondary height adjustment columns. Further, in some embodiments a single support mechanism is incorporated into the implement assembly 100, such as in embodiments where a single support mechanism is sufficient to support the weight of the implement.

While the figures herein provide one particular example of a support mechanism and cooperating components, other configurations are certainly contemplated. In some embodiments the height adjustment column can define at least a portion of a circumferential groove that defines a first locking structure. In some embodiments the first locking structure is a hole defined through the height adjustment column and the second locking structure is a dowel that is coupled to the vehicle frame and configured to be translated for insertion into the hole. In such examples, the dowel can extend through both the vehicle frame 120 and the height adjustment column 170 in a locked position or can extend through the height adjustment column 170 only. In some embodiments the first locking structure is a rectangular slot defined through the height adjustment column and the second locking structure is a wedge that is slidably received by the rectangular slot.

It should also be noted that, as used in this specification and the appended claims, the phrase "configured" describes a system, apparatus, or other structure that is constructed or configured to perform a particular task or adopt a particular configuration. The word "configured" can be used interchangeably with similar words such as "arranged", "adapted," "constructed", "manufactured", and the like.

This application is intended to cover adaptations or variations of the present subject matter. It is to be understood that the above description is intended to be illustrative, and not restrictive, and the claims are not limited to the illustrative embodiments as set forth herein.

What is claimed is:

1. A grounds maintenance vehicle comprising:
a vehicle frame defining a column opening having a first end and a second end;
an implement coupled to the vehicle frame;
a height adjustment column having a base and a distal end, wherein the base is fixed to the implement and the height adjustment column extends through the column opening from the first end beyond the second end,
wherein the height adjustment column defines a first locking structure and a plurality of height setting locations comprising a series of pin openings between the first locking structure and the distal end;
a second locking structure coupled to the vehicle frame, wherein the second locking structure is configured to releasably engage with the first locking structure such that the plurality of height setting locations are positioned beyond the second end of the column opening wherein the first locking structure and the second locking structure are positioned vertically between the first end of the column opening and the base of the height adjustment column; and
a height selection tool configured to be coupled to the height adjustment column, the height selection tool comprising a pin configured to be received by any one pin opening of the series of pin openings and an adjustment collar slidably disposed on the height adjustment column between the pin and the second end of the column opening.

2. The grounds maintenance vehicle of claim 1, wherein the implement comprises a cutting deck having a housing defining a cutting chamber and cutting blades disposed in the cutting chamber.

3. The grounds maintenance vehicle of claim 2, wherein the implement further comprises a handle coupled to the housing.

4. The grounds maintenance vehicle of claim 1, wherein the height selection tool coupled to the height adjustment column has a combined width dimension that exceeds a corresponding width of the second end of the column opening.

5. The grounds maintenance vehicle of claim 1, further comprising wheels coupled to the vehicle frame.

6. The grounds maintenance vehicle of claim 1, wherein the second locking structure comprises a latch configured to selectively engage the height adjustment column.

7. The grounds maintenance vehicle of claim 6, further comprising a fixed collar defined around the height adjustment column, wherein the first locking structure comprises a portion of an annular facing surface of the fixed collar and the second locking structure is defined by an oppositely-facing surface of the latch, wherein the first locking structure and the second locking structure releasably engage one another.

8. The grounds maintenance vehicle of claim 6, further comprising a spring operatively disposed between the latch and the vehicle frame to bias the latch.

9. The grounds maintenance vehicle of claim 8, wherein the spring biases the latch towards the height adjustment column.

10. The grounds maintenance vehicle of claim 8, wherein the spring biases the latch away from the height adjustment column.

11. The grounds maintenance vehicle of claim 1, wherein the plurality of height setting locations comprises a first height setting location and a last height setting location, where the last height setting location is positioned towards the distal end, and the first height setting location is positioned between the first locking structure and the last height setting location.

12. A grounds maintenance vehicle comprising:
a vehicle frame;
an implement translatably coupled to the vehicle frame, wherein the implement is vertically translatable relative to the vehicle frame and has a weight;
a height adjustment column having a base and a distal end, wherein the base is fixed to the implement, wherein the vehicle frame comprises a column opening having a first end and a second end, and the height adjustment column extends through the column opening from the first end past the second end;
a height selection tool configured to select one vertical position of a plurality of selectable vertical positions, wherein each selectable vertical position limits a maximum distance between the implement and the vehicle frame and defines a particular selectable operating height of the implement relative to a ground surface, and wherein at each operating height selected, the weight of the implement is configured to be received by the height selection tool; and
a support mechanism configured to selectively position the implement relative to the vehicle frame, wherein, upon engagement, the support mechanism is configured to prevent the weight of the implement from being received by the height selection tool, wherein the support mechanism comprises a pivotable latch, and wherein, when the support mechanism is engaged, the implement is positioned vertically above each of the particular selectable operating heights of the implement.

13. The grounds maintenance vehicle of claim 12, wherein the pivotable latch is pivotably coupled to the vehicle frame and is configured to selectively engage the implement.

14. The grounds maintenance vehicle of claim 13, further comprising a spring operatively disposed between the pivotable latch and the vehicle frame to bias the latch.

15. The grounds maintenance vehicle of claim 12, wherein the height selection tool is coupled to the height adjustment column, wherein the height selection tool is translatable from a first height setting location towards the distal end of the height adjustment column, and wherein the height selection tool coupled to the height adjustment column has a combined width dimension that exceeds a corresponding width of the second end of the column opening.

16. The grounds maintenance vehicle of claim 15, wherein the height adjustment column defines a series of pin openings between the base and the distal end, and the height selection tool comprises a pin configured to be received by any one pin opening of the series of pin openings.

17. The grounds maintenance vehicle of claim 16, wherein the height selection tool further comprises an adjustment collar slidably disposed on the height adjustment column between the pin and the second end of the column opening.

18. The grounds maintenance vehicle of claim 12, wherein the support mechanism comprises a first locking structure and a second locking structure, wherein the first locking structure is defined by the height adjustment column and the second locking structure is the pivotable latch.

19. The grounds maintenance vehicle of claim 18, further comprising a fixed collar defined around the height adjustment column, wherein the first locking structure comprises a portion of an annular facing surface of the fixed collar and the second locking structure comprises an oppositely-facing surface of the pivotable latch, wherein the first locking structure and the second locking structure releasably engage one another.

20. The grounds maintenance vehicle of claim 12, wherein the implement is a cutting deck comprising a cutting blade and a housing defining a cutting chamber, where the cutting blade is rotatably disposed in the cutting chamber.

21. A mower comprising:
   a vehicle frame defining a plurality of column openings each having a first end and a second end;
   wheels coupled to the vehicle frame;
   a cutting deck coupled to the vehicle frame, wherein the cutting deck comprises a cutting blade and a housing defining a cutting chamber, where the cutting blade is rotatably disposed in the cutting chamber;
   a plurality of height adjustment columns each having a base and a distal end and each defining a series of pin openings between the base and the distal end, wherein each base is fixed to the cutting deck and each height adjustment column slidably extends through a corresponding column opening of the plurality of column openings from the first end beyond the second end;
   a plurality of height selection tools each associated with a particular height adjustment column of the plurality of height adjustment columns, wherein each height selection tool comprises an adjustment collar slidably disposed on the associated height adjustment column, and a pin configured to be removably received by any one of the series of pin openings of the associated height adjustment column, wherein each adjustment collar is configured to be positioned between the second end of the corresponding column opening and the pin; and
   a support mechanism comprising a first locking structure defined by at least one height adjustment column of the plurality of height adjustment columns and a second locking structure configured to releasably engage with the first locking structure such that the series of pin openings are positioned outside of the corresponding column opening, beyond the second end of the column opening, wherein the first locking structure is at least a portion of an annular facing surface defined around each of the at least one height adjustment column and the second locking structure is defined by a manually engageable latch, wherein the latch is pivotable.

\* \* \* \* \*